United States Patent
Hassle

(10) Patent No.: US 9,675,014 B2
(45) Date of Patent: Jun. 13, 2017

(54) METHOD AND ARRANGEMENT FOR GROWING PLANTS

(71) Applicant: Plantagon International AB, Stockholm (SE)

(72) Inventor: Hans Hassle, Katrineholm (SE)

(73) Assignee: PLANTAGON INTERNATIONAL AB, Stockholm (SE)

( * ) Notice: Subject to any disclaimer, the term of this patent is extended or adjusted under 35 U.S.C. 154(b) by 0 days.

(21) Appl. No.: 13/667,490

(22) Filed: Nov. 2, 2012

(65) Prior Publication Data

US 2013/0104453 A1 May 2, 2013

Related U.S. Application Data

(60) Provisional application No. 61/554,767, filed on Nov. 2, 2011.

(51) Int. Cl.
| | |
|---|---|
| *A01G 31/04* | (2006.01) |
| *A01G 9/14* | (2006.01) |
| *A01C 1/02* | (2006.01) |
| *A01C 21/00* | (2006.01) |

(52) U.S. Cl.
CPC ............. *A01G 31/042* (2013.01); *A01C 1/02* (2013.01); *A01C 21/00* (2013.01); *A01G 9/14* (2013.01); *Y02P 60/216* (2015.11)

(58) Field of Classification Search
CPC . A01G 7/00; A01G 9/14; A01G 1/001; A01G 9/00; A01G 9/24; A01G 1/042; A01C 1/02; A01C 1/00; A01C 21/00; Y10S 47/09
USPC ..... 47/1.01 P, 60, 61, 17, 65, 58.1 R, 58.1 S
See application file for complete search history.

(56) References Cited

U.S. PATENT DOCUMENTS

| | | | |
|---|---|---|---|
| 3,432,965 A | 3/1969 | Smith et al. | |
| 4,015,366 A * | 4/1977 | Hall, III | ......................... 47/1.43 |
| 4,180,941 A * | 1/1980 | Korematsu | ....................... 47/14 |
| 4,476,651 A * | 10/1984 | Drury | .................. A01G 31/042 |
| | | | 47/65 |
| 5,253,302 A | 10/1993 | Massen | |
| 5,449,889 A | 9/1995 | Samardzija | |
| 5,901,237 A | 5/1999 | Conrad | |
| 2003/0215354 A1 | 11/2003 | Clark et al. | |
| 2007/0256356 A1 | 11/2007 | Kap | |

(Continued)

FOREIGN PATENT DOCUMENTS

| | | |
|---|---|---|
| EP | 0595431 A1 | 5/1994 |
| FR | 1472285 A | 3/1967 |

(Continued)

*Primary Examiner* — David Parsley
*Assistant Examiner* — Magdalena Topolski
(74) *Attorney, Agent, or Firm* — Birch, Stewart, Kolasch & Birch, LLP

(57) ABSTRACT

A method for cultivating plants is described. The method comprises the steps of sowing seeds in the growing medium in sterilized pots (17) using a sowing device (7), allowing the seeds to germinate in a germination device (8), automatically moving the pots through a greenhouse (2) to allow the germinated seeds to grow into plants (43), harvesting the grown plants using a harvester (5), and sterilizing the pots with the growing medium in a sterilization device (6) after harvest in order to provide sterilized pots (17) with a growing medium. An arrangement for performing the method is also described.

23 Claims, 9 Drawing Sheets

(56) References Cited

U.S. PATENT DOCUMENTS

| | | | | |
|---|---|---|---|---|
| 2007/0269275 | A1* | 11/2007 | Kimberlin | 405/302.6 |
| 2008/0209800 | A1* | 9/2008 | Van Rijn et al. | 47/39 |
| 2009/0229177 | A1* | 9/2009 | Hyde | A01G 7/00 47/1.7 |
| 2009/0307973 | A1* | 12/2009 | Adams et al. | 47/62 C |
| 2011/0131880 | A1* | 6/2011 | Kloas | A01G 31/02 47/62 R |

FOREIGN PATENT DOCUMENTS

| | | | |
|---|---|---|---|
| GB | 922293 | A | 3/1963 |
| GB | 922293 | * | 4/1963 |
| GB | 2121263 | A | 12/1983 |
| JP | 51-22551 | | 2/1976 |
| JP | 52-98128 | A | 8/1977 |
| JP | 1-235524 | A | 9/1989 |
| JP | 2215323 | * | 8/1990 |
| JP | 11-98928 | A | 4/1999 |
| JP | 2000-224933 | A | 8/2000 |
| JP | 2003-23887 | A | 1/2003 |
| JP | 2008-136945 | A | 6/2008 |
| WO | WO2010/022800 | * | 3/2010 |
| WO | 2010138027 | A1 | 12/2010 |

* cited by examiner

METHOD AND ARRANGEMENT FOR GROWING PLANTS

TECHNICAL FIELD

The present invention relates to a method and arrangement for growing plants in a vertical greenhouse. More specifically the present invention relates to a method and an arrangement for growing plants in an industrial manner in a vertical greenhouse.

DESCRIPTION OF THE PRIOR ART

A problem in urbanized areas is that food, once grown and harvested in farms in other regions and countries must travel long distances to reach the consumers in the cities. Such food transports consume energy and adds to the traffic congestion in the cities. A further problem is that greenhouses are often situated far outside urban areas and urban customer's food budget therefore goes to pay for transportation as well as storage.

Hence, growing food crops in vertical greenhouses in cities would help reduce both environmental pollution caused by transportation and transportation costs since the plants are grown where the consumers are. Moreover, vertical greenhouses would be space-efficient and would be adapted for expanding cities where there is a shortage of space. Additionally, vertical greenhouses would be built close to the customers; consequently, the produce would be delivered fresh and at a lower price.

The U.S. Pat. No. 3,432,965 patent document discloses a hydroponics apparatus for automatic germination of seed, growth of produce therefrom and harvesting of produce. A major disadvantage with this apparatus is that it is not adapted for industrial scale production of plants and crops in urban areas since the surface area for the crops to grow is highly limited, as indicated in the specific examples. Moreover, the examples, as well as the claims, clearly illustrate that a plurality of containers holding seeds are connected to a pair of parallel and spaced apart members and that the containers are conveyed horizontally along these members. However, a major disadvantage with this system is that the distance between the parallel members is limited, and this system is therefore not adapted for tall plants. Hence, this system is not applicable for growing all sizes of plants and crops. Additionally, the horizontal conveying system is inflexible and does provide means for long distance transport of plants vertically and diagonally, which makes this system vulnerable in case of malfunction of the horizontal conveying system. Furthermore, the hydroponics apparatus is not modifiable to be integrated with space-efficient vertical greenhouses since the hydroponics apparatus employs a horizontal means of conveying containers. Interestingly, it is not even suggested that the hydroponics apparatus can be integrated or connected with any type of greenhouse. Another disadvantage is that the seeds are not sown in pots, which makes this system inflexible since seeds which have not germinated cannot be removed efficiently. Yet a further disadvantage is that pots are not sterilised after harvest together with the growing medium; hence a method of decreasing waste is not indicated in U.S. Pat. No. 3,432,965.

The patent application WO2010/138027 describes a conveying system and a method for conveying containers. The system and method is primarily intended for moving containers with plants in greenhouses for cultivating plants. However, this document does not (i) disclose any specific methods and arrangements for cultivating plants, (ii) indicate a cultivation system wherein pots are sterilised after harvest together with the growing medium in order to decrease waste, and (iii) describe the use of pumice for growing plants. Furthermore, the greenhouse described in WO2010/138027 does not comprise a sowing device, a germination device, a device for movement of pots into and/or out of trays, an elevator which moves trays with pots with germinated seeds to the starting position of the top of the track, a sterilisation device, and an optional biogas production facility. More importantly, the transport of trays is inflexible since it is dependent on the conveying device, and any other means of transporting the trays along and/or between the tracks has not been disclosed.

The patent application US 2009/0307973 A1 describes a vertically-integrated greenhouse which provides a system of food production in buildings and which can be installed in a double-skin façade. The trays with plants are arranged and affixed to a tray suspension system to which the trays are adjustably affixed one above another in parallel vertical rows and can be vertically raised or lowered. However, a major disadvantage with this system is that the distance between the trays has to be increased as the plants grow which limits the number of trays in circulation. Hence, this system is not adapted for industrial growth of plants and crops.

SUMMARY OF THE INVENTION

An important objective of the present invention is to provide a flexible and automated method and arrangement for cultivating all sizes of plants, as well as to provide a higher surface area for the crops to grow in, and thereby provide means for industrial scale production of crops.

An objective of the present invention is to provide a method and an arrangement for an energy efficient method of growing plants.

A further objective of the present invention is to provide a method and an arrangement for industrial growth of plants which requires a minimum of space and energy.

At least one of these objectives is provided with a method and an arrangement according to the independent claim.

Additional advantages are provided with the features of the dependent claims.

A method according to the invention for cultivating plants comprises the steps of sowing seeds in the growing medium in sterilised pots using a sowing device and allowing the seeds to germinate in a germination device. The pots are automatically moved through a greenhouse to allow the germinated seeds to grow into plants, which are then harvested using a harvester. After harvest the pots are sterilised together with the growing medium in a sterilisation device in order to provide sterilised pots with a growing medium. The method provides for efficient growth of plants and may be performed with a minimum of human intervention. By not exchanging the growing medium, but instead sterilising the pot with the growing medium the waste from the method is drastically decreased in comparison with traditional methods.

Any growing medium that has been lost during harvest may be refilled before sowing.

The growing medium may be any growing medium that is suitable for re-use after sterilisation without being removed from the pot. The growing medium is preferable pumice, which surprisingly has shown to be very suitable to use in a method according to the invention.

The size of the pumice effects its suitability for growth of plants. A suitable particle size of the pumice for growing vegetables such as *Brassica rapa* var. *chinensis, Brassica* rapa spp. *Nipposinica, Chrysanthemum coronarium* and many other vegetables is 0.5-3 mm. Such pumice is sold as Hekla green. A major part of the pumice preferably has a particle size of 0.5-3 mm.

The pots may have an essentially quadratic shape viewed from above. This is an advantageous shape to handle for automatic devices that are to handle the pots.

The height, width and length of the pots may be in the interval 0.03-0.3 meters, preferably 0.05-0.2 meters and most preferred in the interval 0.07-0.12 meters. With such dimensions a sufficient amount of growing medium may be contained in the pot for the above mentioned plants to grow. It is favourable not to exceed the mentioned dimensions as this will add to the mass that has to be transported in the system and will thus add to the energy consumption of the method. Furthermore, it is advantageous not to increase the height of the pots also for the reason that the watering of the plants may be more difficult if the pots are made too high. If the pots are made too high it is not possible to let them absorb water from below.

The pots may have at least two opposite walls that are slightly inclining so that the cross-sectional area of the pots decreases towards the bottom of the pots. This will make it easier to remove the pots from a support.

The pots with germinated seeds are preferably placed in trays. In this way a large number of pots may be controlled in a more simple way. With the pots being placed in trays it is preferable to have the above mentioned inclining walls as this facilitates the removal of the pots from the trays.

The pots may be removed from the trays before germination but after sterilisation so that the trays are sterilised at the same time as the pots. By removing the pots from the trays the pots may be placed in contact with each other during sowing and germination. This saves space and thus decreases the size and cost of the devices for handling the pots during sowing and germination. During sowing and germination the plants do not extend outside the pot. During growth the plants may grow to extend outside the pot making it necessary to arrange the pots at a distance from each other.

The trays may have a decreasing width towards the bottom, which corresponds to the width of the pots. By having corresponding shapes of the pots and the trays the pots may be well supported in the trays.

The trays may be elongated with a length axis to allow a single row of pots to be placed in the tray along the length axis. By having only a single row of pots arranged in the trays the distance between the pots may be varied in one dimension during growth of the plants. This makes it possible to adapt the size between the pots as a function of the size of the plants during the growth. This makes it possible to use the space in the greenhouse more efficiently. Alternatively it is of course possible to have trays which allow more than one row of pots.

The method may also comprise the step of, before placing the pots in the trays, controlling that the seeds in the pots have germinated so that only pots in which the seeds have germinated are placed in the trays. This is important in order to optimize the output of the method. In this way no pots without plants will be transported through the greenhouse.

The method may comprise the step of using a greenhouse with a track comprising at least two essentially parallel beams for supporting the trays, which track has a form resembling a helix, on which track the trays are arranged to be moved so that they are exposed to sunlight. By using such a greenhouse an efficient use of the ground is provided, which is advantageous if the method is to be used in a city.

The method may comprise the use of a greenhouse in which the trays on the tracks are to be arranged with their length axes perpendicular to the beams of the tracks. This is advantageous in that the distance between the pots in one direction may easily be adapted to the size of the plants.

The method may also include the step of intermittently watering the plants by intermittently providing water to the trays, wherein the pots and the trays are arranged for the growing medium in the pots to absorb water in the trays. This is an uncomplicated way of watering the plants as the growing media in the pots absorb the necessary amount of water.

The method may comprise the step of providing the trays with a bottom that is inclined at an angle of 0.5-2 degrees to the horizontal direction. By providing the trays with an inclining bottom the water will stream along the tray. In this way water will be provided to all pots in the tray. With an inclining bottom it is also avoided that water forms static puddles in which germs and bacteria may grow.

The sterilisation may be performed by heating of the pots with the growing medium. By performing the sterilisation by heating the use of chemicals is avoided which may be advantageous.

The heating may be performed using steam. The use of steam is an uncomplicated way of sterilising the growing media, the pot and the tray.

Alternatively the heating may be performed using microwave radiation to heat the residual water in the pots, to thereby heat the growing medium and the pots. This is a fast and efficient way of heating the growing medium.

The time period during which the pots are heated may be chosen so that the majority of the bacteria is killed.

According to a second aspect of the present invention an arrangement for cultivating plants is provided, which apparatus comprises a sowing device for sowing seeds in a growing medium arranged in pots, a germination device for allowing the seeds to germinate in the pots, a greenhouse for allowing the germinated seeds to grow to plants, means for moving the pots through the greenhouse, a harvester for harvesting the grown plants, and a sterilisation device for sterilising the pots with the growing medium after harvest in order to provide sterilised pots with a growing medium.

The arrangement according to the second aspect of the invention provides for efficient growth of plants and may be performed with a minimum of human intervention. By not exchanging the growing medium, but instead sterilising the pot with the growing medium the waste from the method is drastically decreased in comparison with traditional methods.

The arrangement may comprising an arrangement device (i.e. a device for movement of pots) for arrangement of the pots in trays with a length axis. By arranging the pots in trays it is possible to minimize the size of the pots, and thus also the weight of the growing medium, while maintaining a stable arrangement of the pots during growth.

The trays may have a decreasing width towards the bottom, which corresponds to the width of the pots. By having the pots and the trays arranged in this way the pots are well supported by the trays and will also be relatively easily removable due to the decreasing width of the pots. Pinching of the pots in the trays is avoided due to the decreasing width of the pot.

The trays may be elongated to allow a single row of pots to be placed in the tray along the length axis. With such trays the distance between the trays and thus also the pots may be varied.

The means for moving may comprise a track comprising at least two essentially parallel beams for supporting the trays, which track may have a form resembling a helix, and at least one conveying device which is arranged to travel along the track and which comprises a tray moving unit, which after passing plant tray is arranged to move at least one tray one step along the track, the conveying device thus moving containers stepwise along the track during the travel along the track. Such means for moving requires a limited power as only a small number of trays are moved simultaneously. Alternatively the means for moving may comprise standard conveyor belts which are arranged to move the trays.

Alternatively the track may be divided in a number of track portions connected by track connection means, such as, e.g., an elevator. The track portions may be horizontal.

The tracks may be arranged for arrangement of the trays on the tracks with their length axes perpendicular to the beams of the tracks. By arrangement of the trays in this way the distance between the pots may be easily variable in one direction.

The track may be arranged inclined at an angle of 0.5-2 degrees to the horizontal direction, which hinders water from remaining on the bottom of the trays. Thus, the pots may be provided with water by providing the trays with water at the high end. The water will then flow down the tray and pass the pots. The growing medium in the pots will absorb water, and the remaining water may flow out of the tray through an opening provided at the lower end of the tray.

The arrangement may comprise watering means arranged for intermittently providing water to the trays at the highest side of the trays. By intermittently providing water to the trays the watering may be performed more economically.

The watering means may comprise pipes situated at distances corresponding to the length of the steps of the stepwise movement of the trays. Thus, the trays are moved to positions corresponding to the positions of the pipes.

The arrangement may further comprise a system for continuously purifying excess water that flows out from the openings in the trays. The excess water may pass through a mechanical filter for separating plant parts and pumice from the water. A biological filter comprising zeolite and pumice may be used to purify the water from pathogens and metabolites. A second mechanical filter may be used to separate zeolite and pumice particles from the water purified by the biological filter. A UV filter may also be employed if necessary. The excess water which has passed through the various filters can be collected in buffer tanks. The recycled excess water may be mixed with nutrient, fertilizer and fresh water, and then pumped back to the relevant parts of the arrangement.

The arrangement may be integrated or connected with a biogas production plant, so that organic waste from the harvest is transported to the biogas production plant and bionutrients from the biogas production is transported to the means for sowing seeds in pots. Such an integration of a biogas production plant gives mutual advantages by providing a way of dispensing the waste products from one process to the benefit of the other process.

The arrangement may also comprise means for inspection that the seeds in the pots have germinated. Such means may be comprised of a camera connected to a computer. By providing such means pots in which the seeds have not germinated may be returned to the sowing device. In this way the efficiency of the arrangement may be optimised.

The trays may comprise a unique identification tag such as Radio Frequency Identification (RFID) tag or barcode, and scanning devices can be placed in various parts of the arrangement. Hence, the movement of the trays within a track portion, as well as, between one track portion and another track portion below, can be monitored and controlled.

BRIEF DESCRIPTION OF DRAWINGS

In the following preferred embodiments of the invention will be described with reference to the appended drawings on which.

Figure 1:
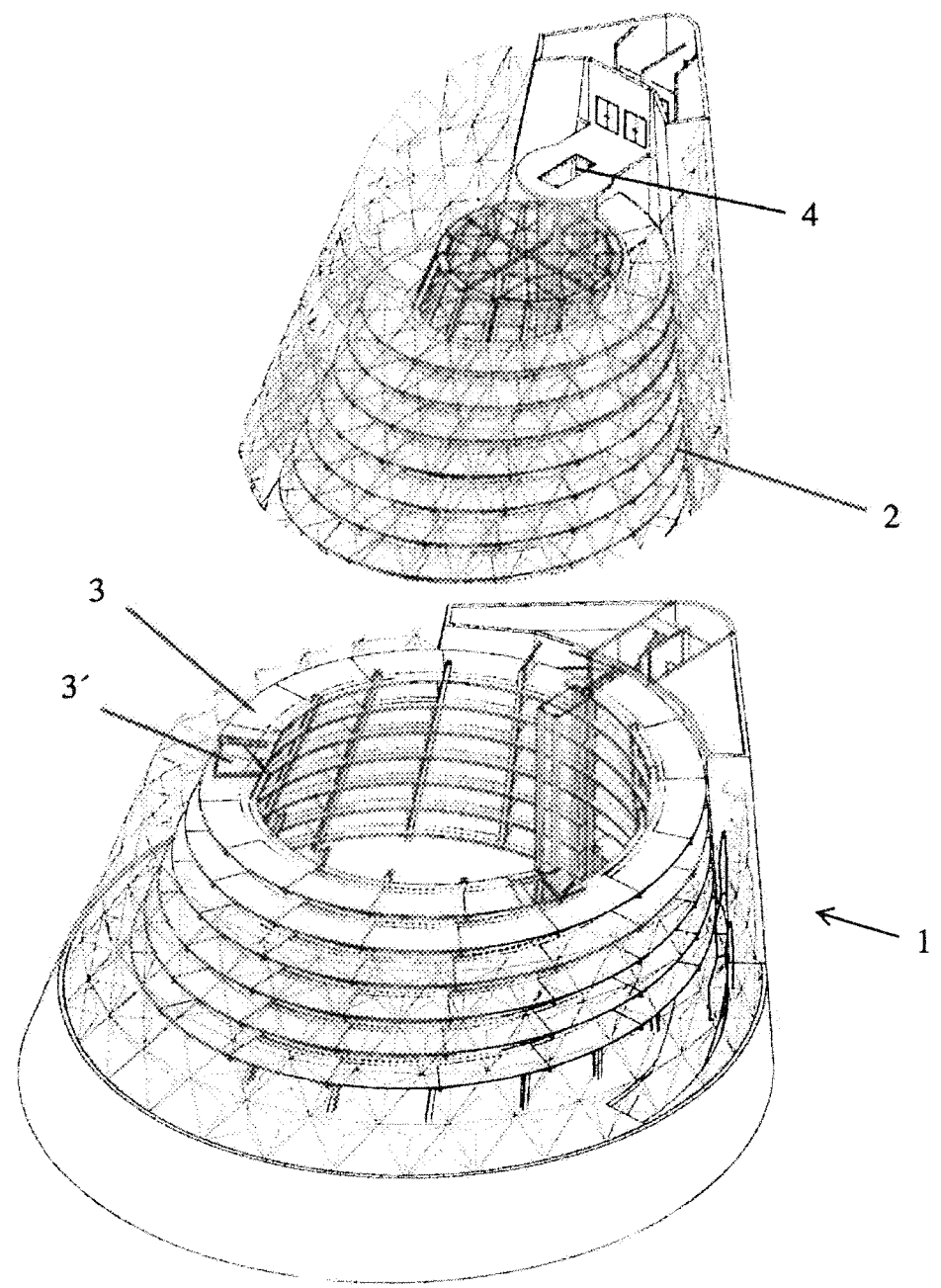
FIG. 1 shows schematically, partly in cross-section, a building for industrial growth of plants.

DESCRIPTION OF PREFERRED
EMBODIMENTS OF THE INVENTION

In the following description of preferred embodiments the same reference numerals will be used for similar features in the different figures. It is to be noted that the figures are not drawn to scale.

FIG. 1 shows, partly in cross-section, an arrangement according to an embodiment of the invention in the form of a building 1 for industrial growth of plants. The main part of the building is a greenhouse 2 in which two parallel tracks 3, 3', are arranged for supporting trays (FIG. 3). The tracks 3, 3', have a form resembling a twinning helix, on which tracks 3, 3', the trays (FIG. 3) are arranged to be moved from the top of the building to the bottom of the building so that the plants are exposed to sunlight. The tracks 3, 3' can each comprise up to 4 parallel track portions (14). A sowing device, a germination device, a harvester and a sterilisation device (FIG. 2) are arranged in the bottom of the building 1.

The building 1 also comprises an elevator 4 for moving trays from the bottom of the building to the start of the track at the top of the building 1.

Figure 2:
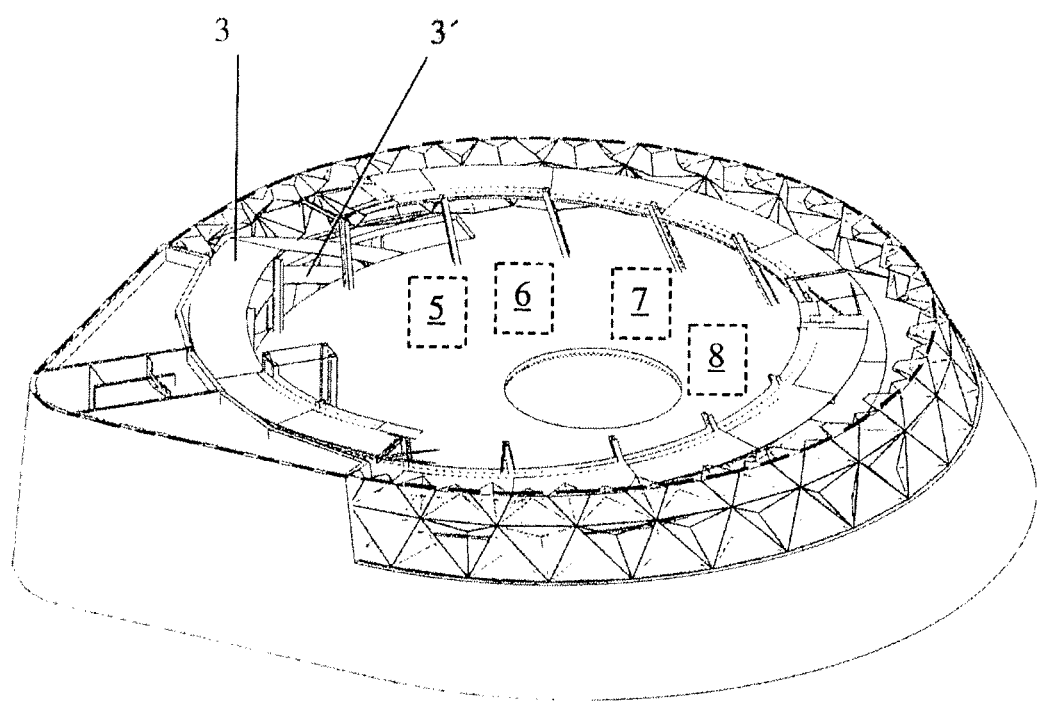
FIG. 2 shows in cross section the bottom of the building shown in FIG. 1.
Figure 3:
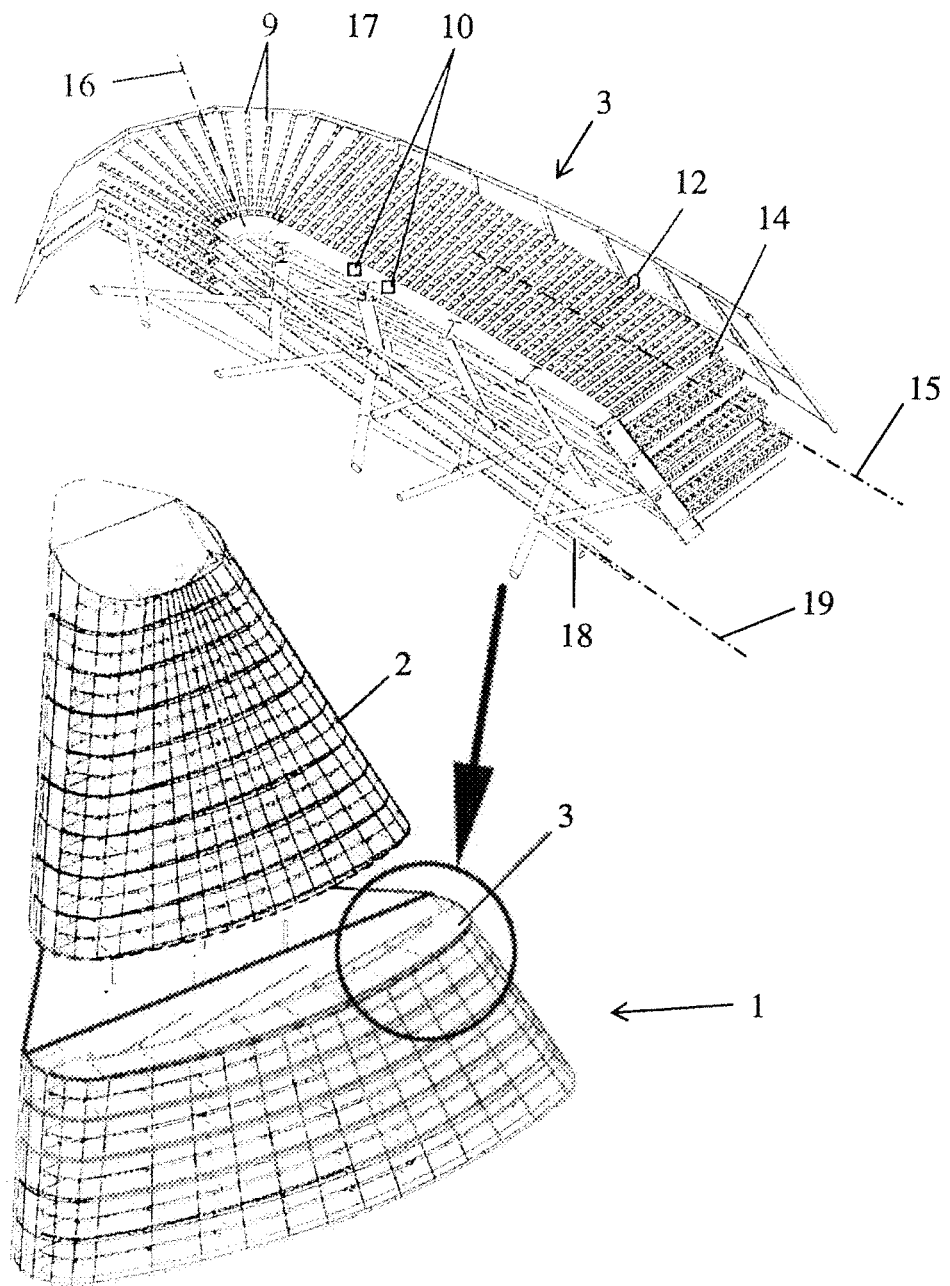
FIG. 3 shows partly in cross section a building for industrial growth of plants according to an alternative embodiment of the present invention.

FIG. 2 shows in cross section the bottom of the building shown in FIG. 1. In FIG. 2 it is shown how the tracks enters the bottom floor of the building 1. The trays are then passed through the harvester 5, and the sterilisation device 6. The pots are then removed from the trays and passes the sowing device 7, and the germination device 8 before the pots are arranged in the trays and lifted up to the top of the building by means of the elevator 4.

FIG. 3 shows partly in cross section a building 1 for industrial growth of plants according to an alternative embodiment of the present invention. In the embodiment shown in FIG. 3 the greenhouse comprises a track 3 with a number of track portions 14 with a length axis 15 for the arrangement of trays 9. The track portions are connected with track connecting means 18, which each have a length axis 19 and which connect the track portions 14. The trays 9 are elongated with a length axis 16 and arranged for placement of pots 17 in a single row along the length axis 16 of the tray. Growing medium in which plants are to grow is arranged in the pots 17. The track portions 14 are arranged for trays 9 to be arranged with their length axes 16 perpendicular to the length axes 15 of the track portions 14. In the shown embodiment the track connecting means comprises inclining straight paths 18 with length axes 19, wherein the paths 18 are arranged for transportation of trays 9 with their length axes 16 parallel to their direction of transportation. The straight paths 18 are arranged for the trays to slide down (diagonally) from one track portion 14 to another track portion 14 below. Furthermore, this embodiment also provides flexible means for trays to bypass a hindrance or a stop in the transportation route, e.g. caused by malfunction in the vertical transportation route of the elevator, by providing diagonal means of transport of trays in the greenhouse.

Watering means in the form of water outlets 10, of which only three are shown, are provided to intermittently provide water to the trays 9 on the track portions 14. The water outlets 10 are arranged at a distance corresponding to the intended pitch 12 between the trays 9. In this way each one of the trays 9 may be provided with water at each time. The time interval between the points of time when the trays 9 are provided with water is adapted to the vegetable in the pots 17 of the tray 9.

The description of the placement of trays on the track is valid also for the embodiment of FIG. 1.

The greenhouses described above are preferred embodiments of the greenhouse according to the invention. However, according to the invention it is possible to use any other type of greenhouse in which plants are automatically moved.

Figure 4:
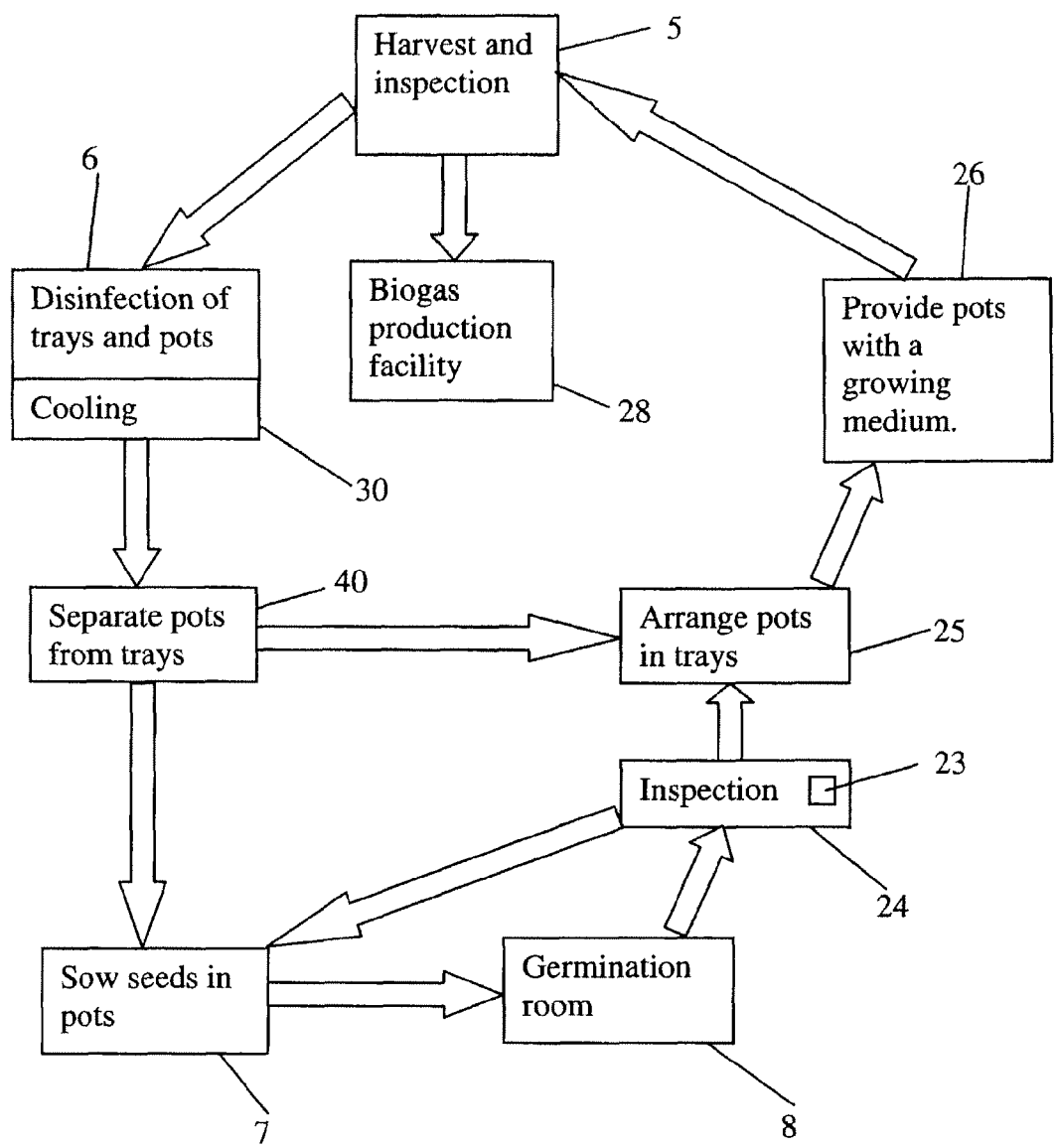
FIG. 4 shows schematically an arrangement for cultivating plants according to an embodiment of the present invention.
Figure 5:
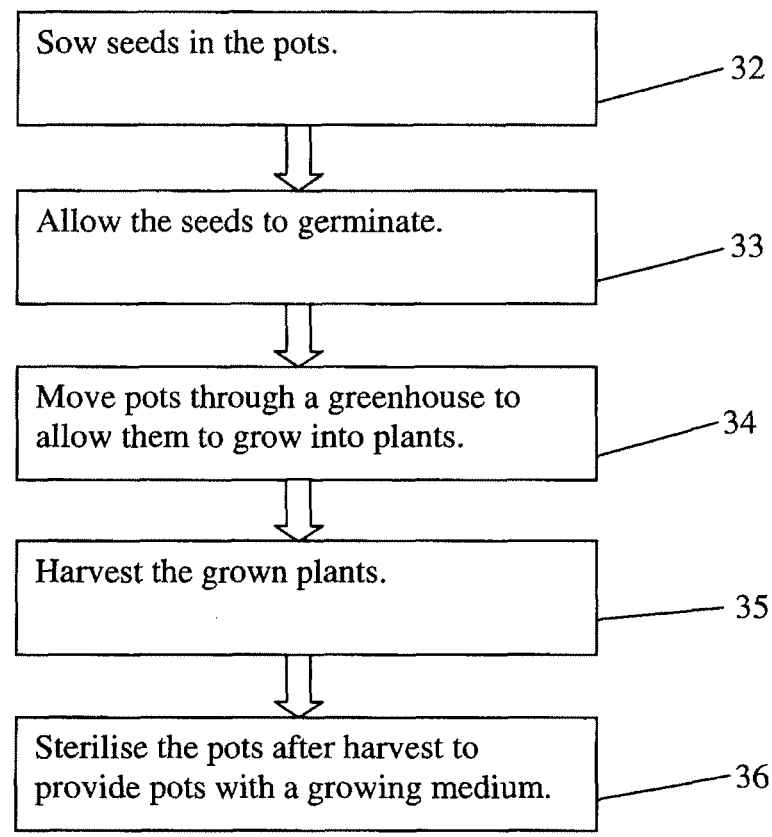
FIG. 5 is a flow diagram of a process for growing plants according to an embodiment of the present invention.

FIG. 4 shows schematically an arrangement 1 for cultivating plants according to an embodiment of the present invention. FIG. 5 is a flow diagram of a process for growing plants according to an embodiment of the present invention. The arrangement and the method will be described in the following.

The growing medium in the pots 17 may be any growing medium, which is suitable for repeated cultivation of plants, so that new seeds may be sowed in the pots after harvest without having to exchange the growing medium. A suitable growing medium is pumice. Pumice is available from many different sources and may have different properties. A suitable particle size of the pumice for growing vegetables such as *Brassica rapa* var. *chinensis, Brassica rapa* spp. *Nipposinica, Chrysanthemum coronarium* and many other vegetables is 0.5-3 mm. Such pumice is sold as Hekla green.

The volume of the growing medium is suitably about 0.5-1 liters. Pots and trays are described in more detail below with reference to FIGS. 8 and 9.

The pots with the growing medium are provided to the sowing device 7, in which seeds are sowed in the growing medium in the pots. This corresponds to step 32 in FIG. 5. The sowing device 7 may comprise a machine such as a robot that puts the seeds into the growing medium and provides a suitable amount of water to the growing medium. In the sowing device 7 the growing medium in the pots may also be provided with nutrients and fertilizers to enhance the growing of the plants.

Alternatively the sowing device is only partially automated. The sowing of the seeds may be performed manually by a person operating the sowing device. The sowing device may then perform only parts of the sowing operation.

After the sowing the pots 17 are moved by a machine or manually to a germination device 8, in which the sowed seeds are allowed to germinate. This corresponds to step 33 in FIG. 5. In the germination device 8 the temperature and humidity are optimised to enhance germination and the pots 17 may also be provided with water at suitable intervals. The temperature and humidity in the germination device 8 are kept suitable for the specific seeds to germinate. The pots 17 are kept in the germination device 8 for a predetermined time after which they are transported manually or automatically to means for inspection 24.

In the means for inspection 24 the pots are inspected manually or by an automated system utilising a digital camera 23, to determine whether the seeds have germinated or not. The pots 17 in which the seeds have not germinated are sent back to the filling station 21 while the pots 17 in which the seeds have germinated are sent to the arrangement device 25 (i.e. the device for movement of pots).

In the arrangement device 25 (i.e. the device for movement of pots) the pots are placed in a single row in elongated trays 9. The pots 17 are placed in the trays 9 manually or automatically. The trays 9 are then moved to the greenhouse 2.

In the greenhouse the trays are moved automatically along the track 3, 3', in the greenhouse 2, as has been described above, to allow the germinated seeds to grow into plants. This corresponds to step 34 in FIG. 5. The track in the greenhouse extends from a starting position, which preferably is situated at the top of the greenhouse, to an end position, which preferably is situated at the bottom of the greenhouse. By arranging the track inclining from the starting position to the end position the gravity will help moving the trays along the track. The track in the greenhouse 2 is described in more detail in connection with FIGS. 11 and 12. During movement through the greenhouse 2 the pumice in the pots is provided with water by intermittently providing water to the trays 9 in which the pots 17 are arranged. The pots 17 are arranged to allow the pumice in the pots 17 to absorb water from the trays 9.

After having passed the greenhouse the plants are ready for harvest and are sent to a harvester 5 in which the grown plants are harvested. This corresponds to step 35 in FIG. 5. The plants are inspected preferably before harvesting to determine that the grown plants fulfill predetermined requirements on size and or quality. The inspection may be fully automated using a camera connected to a computer, which may determine the size and the colour of the plants from the image taken with the camera. Plants that do not fulfill the predetermined requirements are preferably sent to a biogas production plant 28, which preferably is integrated with or directly connected to the arrangement 1. The harvested plants may be packed and sold in a facility integrated with the arrangement 1. Alternatively the plants are packaged and transported to a sales facility, such as a supermarket.

After harvest the trays 9, the pots 17 and the growing medium in the pots 17 are sterilised by moving the trays and the pots containing the growing medium, into a sterilisation device 6 in which the trays and pots are subjected to steam. After the sterilisation device the trays 9 are moved through a cooling device 30 in which the trays 9, the pots 17 and the growing medium are allowed to cool off. After the trays 9 have cooled off the trays 9 are transported to the separating device 40 in which the pots 17 are removed from the trays 9 and moved into the sowing device 7 described above.

Figure 6:
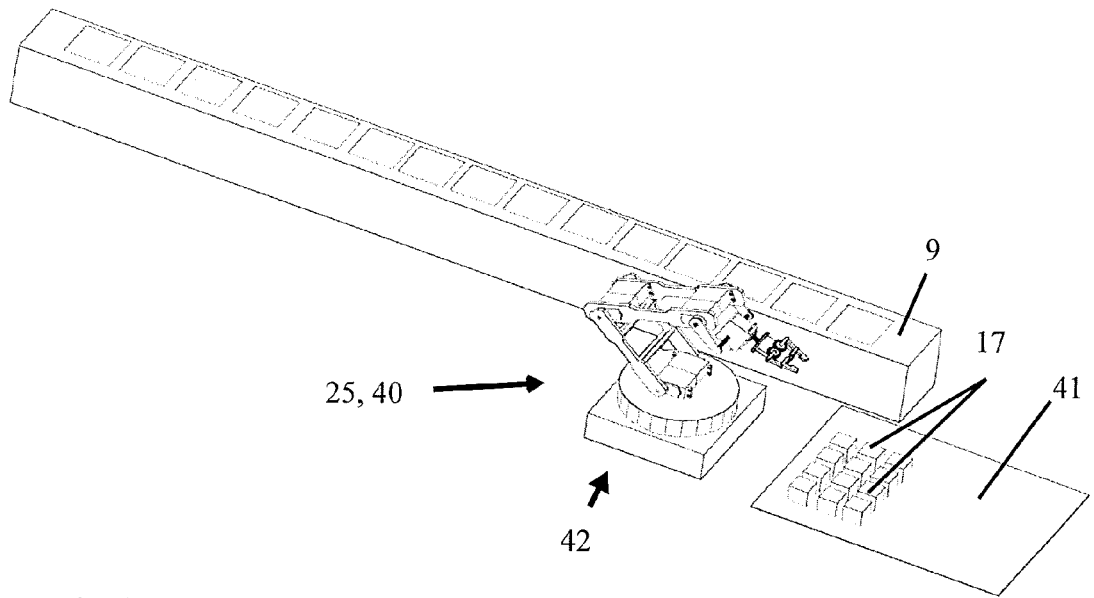
FIG. 6 shows a tray and a robot for arranging and/or removing pots from the tray.

FIG. 6 shows the separating device 40 or alternatively the arrangement device 25 (i.e. device for movement of pots) for movement of pots 17 into or out from a tray 9. The device 25, 40 comprises a robot 42. In the separating device the robot 42 removes the sterilised pots 17 from the trays 9 and arranges them on a pallet 41. In the arrangement device (i.e. device for movement of pots) the robot 42 moves pots 17 with germinated seeds from the pallet 41 to the tray 17.

Figure 7:
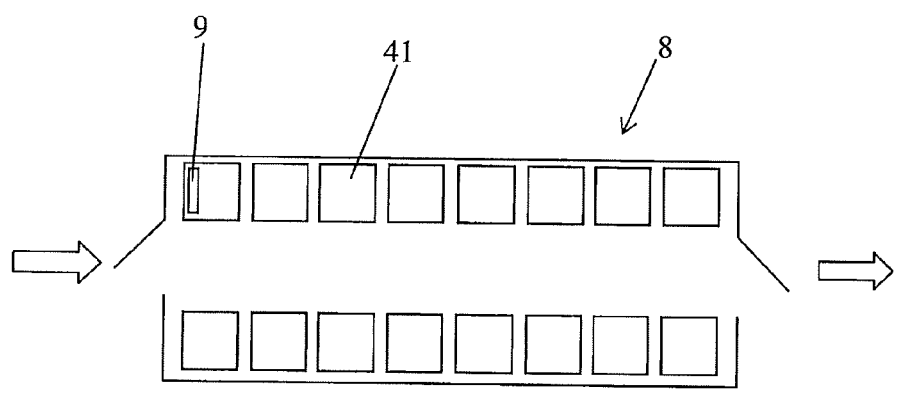
FIG. 7 shows schematically a germination device for germination of seeds in the pots.

FIG. 7 shows the germination device 8 into which pallets 41 with trays 9 are moved for germination.

Figure 8:
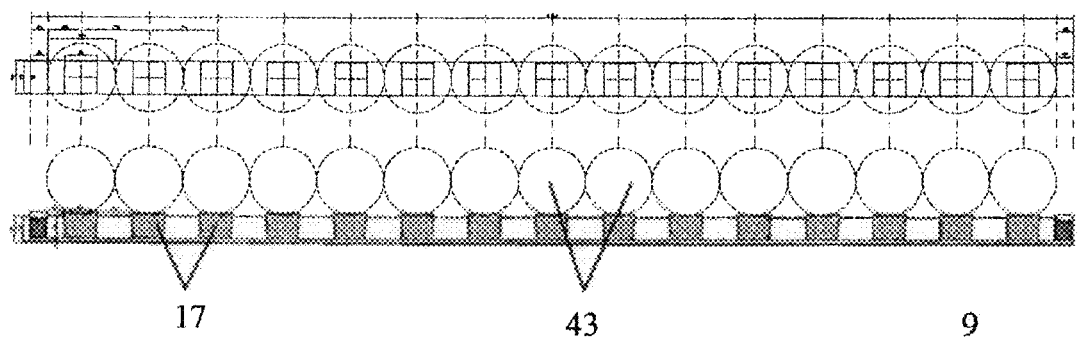
FIG. 8 shows in cross section a tray with pots that is used in a process for industrial growth of plants according to an embodiment of the present invention.
Figure 9:
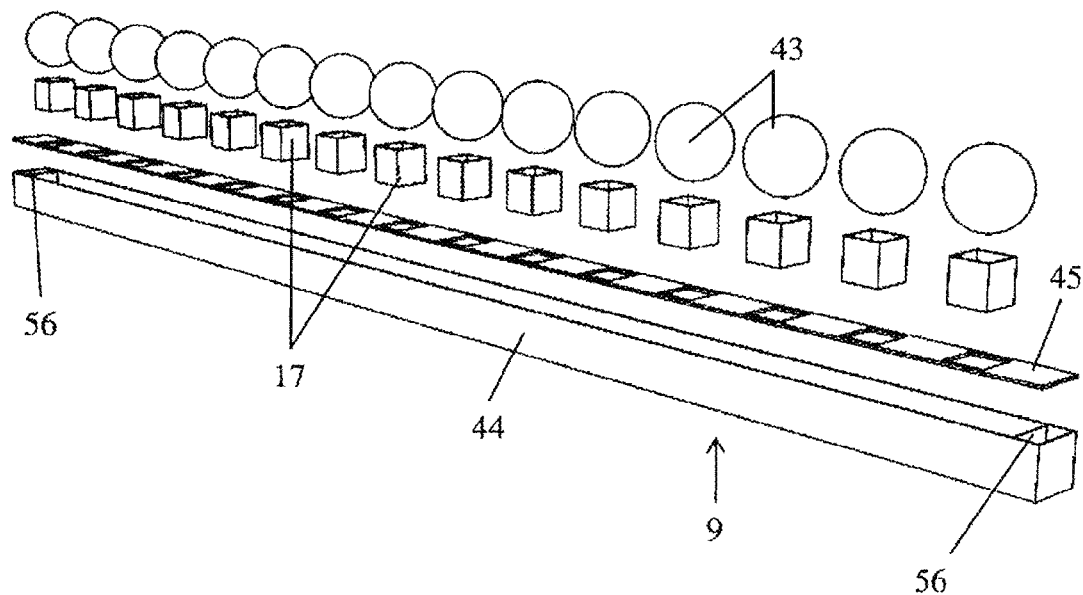
FIG. 9 is an exploded view of the tray and pots shown in FIG. 8.

FIG. 8 shows a cross section of a tray 9 with pots 17 with plants 32. FIG. 9 is an exploded view of a tray 9 with pots 17 and plants 32. As is shown in FIG. 7 the tray consists of a bottom 44 and a lid 45. Holes 34 are formed in the lid in order to receive the pots 17. Water containers 56 are formed at both ends of the tray 8.

Figure 10:
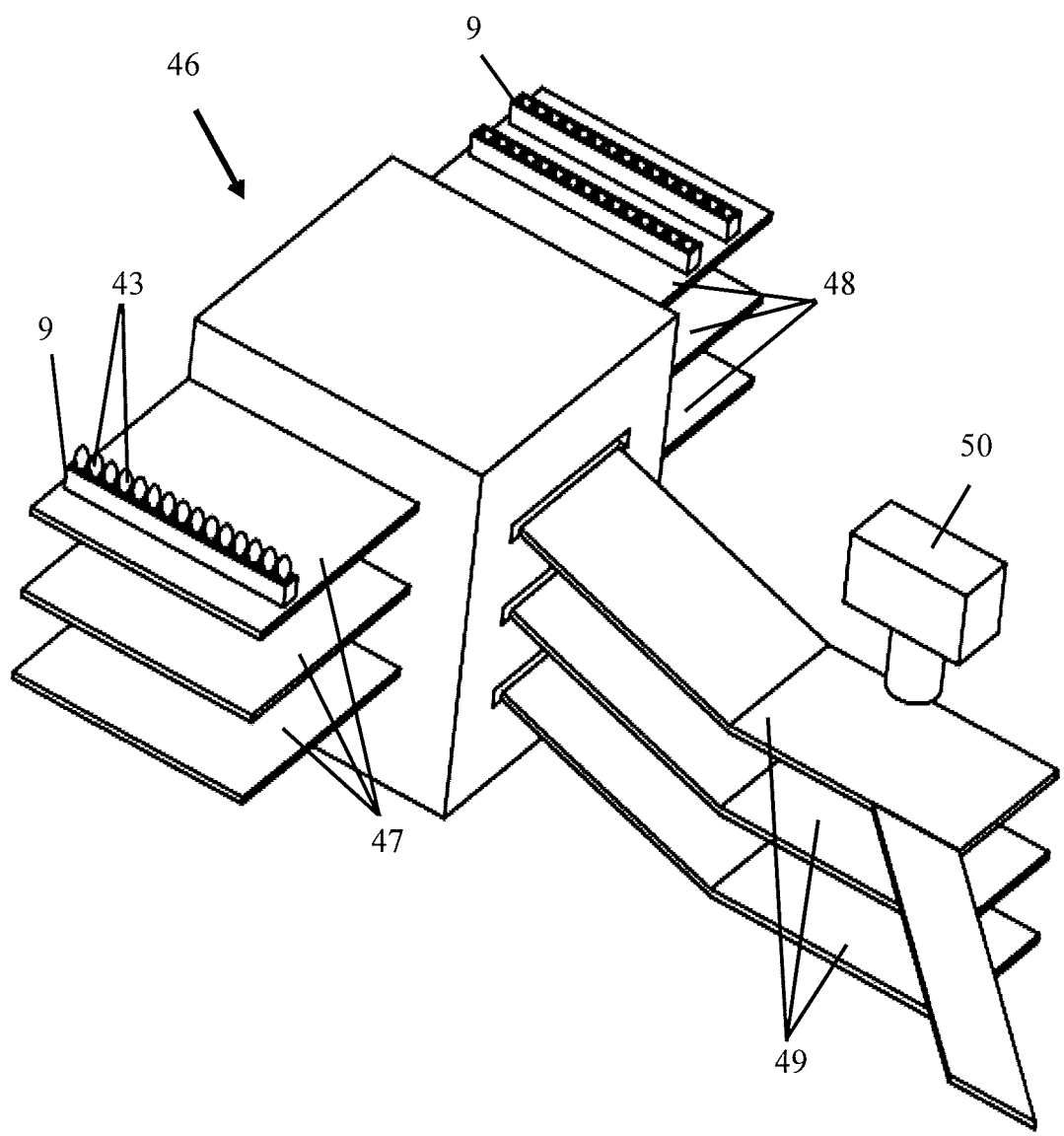
FIG. 10 shows schematically a harvester used in the method and arrangement of the invention.

FIG. 10 shows a specific embodiment of harvester 5, referred to as harvesting unit 46, for harvesting the grown plants 43. Three parallel conveyor belts 47 move trays 9 with plants 43 into the harvesting unit 46. The empty trays are moved out of the harvester on second conveyor belts 48. The harvested plants are transported on third conveyor belts 49. A camera 50 is provided to inspect the harvested plants. Alternatively a camera may be arranged to inspect the plants in the trays before harvest. The sterilisation device 6 may be integrated in the harvesting unit 46.

Figure 11:
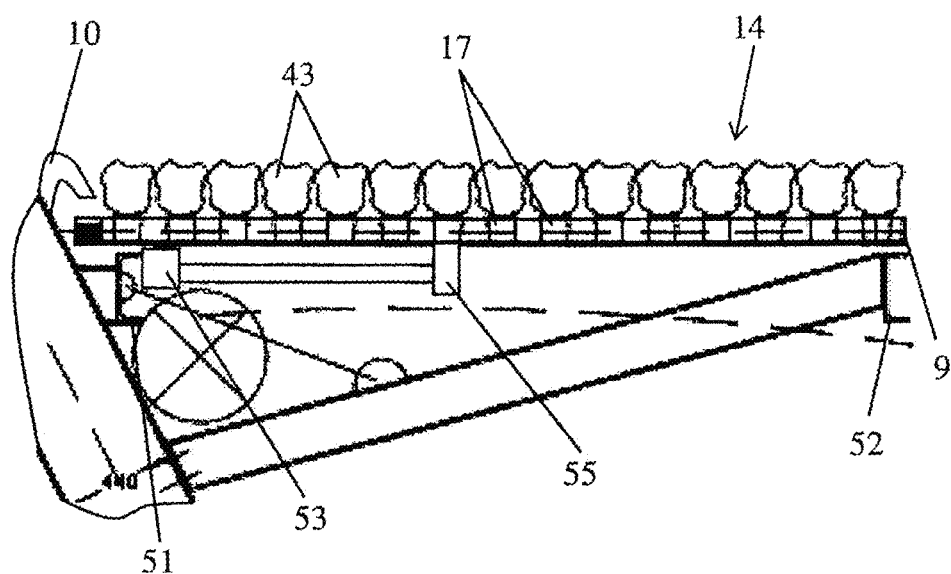
FIG. 11 shows in cross section the track for the arrangement of trays with pots and plants according to an embodiment of the present invention.

FIG. 11 shows a cross section of the track 14 in more detail according to an embodiment of the invention. The track 14 comprises a first beam 51 and a second beam 52. A tray 9 with a number of pots 17 is supported by the first beam 51 in one end of the tray 9 and by the second beam 52 in the other end of the tray 9. A conveying device 53 is arranged to travel along the first beam 51 and comprises a tray moving unit 55 which after passing a tray 9 is arranged to move the tray 9 one step along the track portion 14. Water outlets 10 are arranged at the first beam 51. Pots 17, in which plants 43 grow, are arranged in the trays 9.

Figure 12:
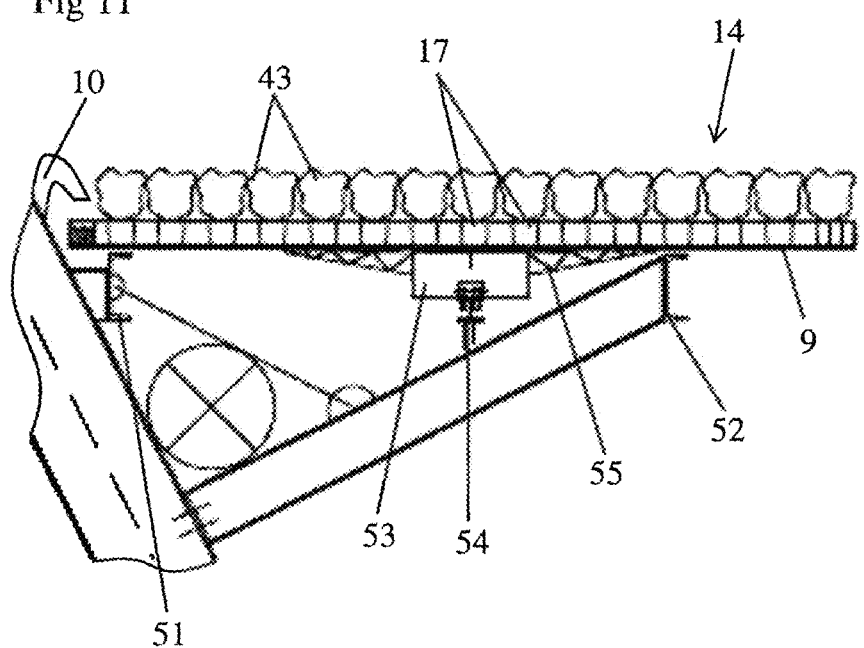
FIG. 12 shows the track for the arrangement of trays with pots and plants according to an alternative embodiment of the present invention.

FIG. 12 shows a cross section of the track portion 14 in more detail according to an alternative embodiment of the invention. Only the differences between the embodiment of FIG. 5 and FIG. 6 will be described. The track portion 14 comprises a third beam 54 on which the conveying device 53 is arranged. Furthermore, the second beam 52 is arranged supporting the tray 9 at a position between the ends of the tray 9.

The invention claimed is:

1. A method for cultivating plants in a building including a greenhouse, including the steps of:
   sowing seeds in a growing medium in sterilised pots using a sowing device, wherein the sowing device also provides at least one of water, nutrient or fertilizers to the growing medium;
   allowing the seeds in the pots to germinate in a germination device;
   controlling whether the seeds in the pots have germinated;
   placing only pots with germinated seeds into trays using a device for movement of pots;
   automatically moving the pots through the greenhouse to allow the germinated seeds to grow into plants, wherein the greenhouse comprises at least two parallel tracks for moving trays from a starting position at a top of the building to an end position at a bottom of the building, wherein said parallel tracks are formed by a number of elongated horizontal track portions connected by track connectors arranged at an angle relative the elongated horizontal track portions to form downwardly inclining paths with a length axis;
   moving the trays to one of the elongated horizontal track portions of one of said parallel tracks using an elevator, wherein the trays are moved from the bottom of the building to the start position of the elongated horizontal track portion at the top of the building;
   moving trays through the greenhouse by a conveyor;
   sliding down trays from one elongated horizontal track portion to another elongated horizontal track portion below with their length axis parallel to their direction of transportation using the track connector;
   harvesting the grown plants using a harvester; and
   sterilising the pots with the growing medium, in a sterilisation device after harvest in order to provide sterilised pots with a growing medium.

2. The method according to claim 1, wherein the trays are moved through the greenhouse by the conveyor comprising the elongated horizontal track portions, each elongated horizontal track portion comprising a first beam and a second beam, wherein the trays are supported by the beams, and a conveying device arranged to travel along the first beam and comprising tray moving unit, which after passing one of the trays moves the tray one step along the elongated horizontal track portion, the conveying device thus moving trays stepwise along the elongated horizontal track portion during the travel along the track.

3. The method according to any one of the preceding claims, wherein the seeds are sown in medium in pots which have at least two opposite walls that are slightly inclining so that the cross-sectional area of the pots decreases towards the bottom of the pots, and wherein said pots are placed in trays which have a decreasing width towards the bottom which corresponds to the width of the pots, and wherein the trays are elongated with a length axis to allow a single row of pots to be placed in the tray along the length axis, and wherein the said trays are arranged on the track with their length axes perpendicular to the beams of the track.

4. The method according to claim 1, comprising the step of intermittently watering the plants by intermittently providing water to the trays, wherein the pots and the trays are arranged for the growing medium in the pots to absorb water in the trays, and further comprising the step of hindering water from remaining on the bottom of the trays using trays with a bottom that is inclined at an angle of about 0.5-2 degrees to the horizontal direction, wherein the remaining water flows out of the tray through an opening provided at the lower end of the tray.

5. The method according to claim 4, comprising steps for continuously purifying and recycling excess water that flows out from the openings in the trays, wherein the excess water passes through (i) a mechanical filter for separating plant parts and growing medium from the water, (ii) a biological filter comprising zeolite and pumice for purifying the water from pathogens and metabolites, (iii) at least one of a second mechanical filter for separating zeolite and growing medium particles from the water purified by the biological filter and (iv) a UV filter, wherein the excess water which has passed through the various filters is collected and thereafter mixed with nutrient, fertilizer and/or fresh water, and then pumped back to the arrangement for watering and providing plants with nutrient and fertilizer.

6. The method according to claim 1 or 2, wherein the step of controlling that the seeds in the pots have germinated includes using an automated inspection device, including a digital camera connected to a computer.

7. The method according to claim 1 or 2, comprising the step of harvesting the grown plants using harvester with a harvesting unit, wherein three parallel first conveyor belts move trays with plants into harvesting unit where the empty trays are moved out of the harvester on three parallel second conveyor belts, and the harvested plants are transported on three parallel third conveyor belts where a camera connected to a computer is provided to inspect the harvested plants to determine the size and colour of the plants.

8. The method according to claim 7, wherein organic wastes from the harvest inspection comprising plants that do not fulfil predetermined requirements, are sent to a biogas production plant wherein bionutrients from the biogas production are transported to the sowing device.

9. The method according to claim 1 or 2, comprising the step of sterilising the pots with the growing medium using a sterilisation device in which the trays and pots are subjected to steam, and the trays are thereafter moved through a cooling device in which the trays, the pots and the growing medium are allowed to cool off and are transported to a separating device, in which the pots are removed from the trays and moved into the sowing device.

10. The method according to claim 1 or 2, wherein the sterilisation is performed using microwave radiation to heat residual water in the pots, to thereby heat the growing medium and the pots.

11. The method according to claim 1 or 2, further comprising scanning unique identification tags of said trays such as Radio Frequency Identification (RFID) tags or barcodes in order to monitor and control movement of the trays.

12. Arrangement for cultivating plants in a building with a greenhouse, the arrangement comprising:
a sowing device for sowing seeds in a growing medium arranged in pots, wherein the sowing device also is arranged for providing water, nutrient and/or fertilizers to the growing medium;
a germination device for allowing the seeds to germinate in the pots;
an inspection device configured to determine whether the seeds have germinated;
a device for movement of pots, for placement of pots into trays;
a greenhouse for allowing the germinated seeds to grow to plants, wherein the greenhouse comprises at least two parallel tracks for moving trays from a start position to an end position, wherein said parallel tracks are formed by a number of elongated horizontal track portions connected by track connectors arranged at an angle relative the elongated horizontal track portions to form downwardly inclining paths with a length axis, wherein the paths are arranged for transportation of trays with their length axis parallel to their direction of transportation, wherein the said straight paths are arranged for the trays to slide down from one elongated horizontal track portion to another elongated horizontal track portion below;
an elevator for moving trays to one of the elongated horizontal track portions of the parallel tracks, wherein the elevator moves trays from the bottom of the building to the start position of the elongated horizontal track portion at the top of the building;
a conveyor for moving the trays through the greenhouse,
a harvester for harvesting the grown plants; and
a sterilisation device for sterilising the pots with the growing medium after harvest in order to provide sterilised pots with a growing medium.

13. The arrangement according to claim 12, wherein the conveyor for moving the trays through the greenhouse comprises the elongated horizontal track portions, each elongated horizontal track portion comprising a first beam and a second beam, wherein the trays are supported by said beams, and a conveying device arranged to travel along the first beam and comprising tray moving unit, which after passing one of the trays moves the tray one step along the elongated horizontal track portion, the conveying device thus moving trays stepwise along the elongated horizontal track portion during the travel along the elongated horizontal track portion.

14. The arrangement according to claim 12 or 13, wherein the pots have at least two opposite walls that are slightly inclining so that the cross-sectional area of the pots decreases towards the bottom of the pots, and wherein the trays have a decreasing width towards the bottom, which corresponds to the width of the pots, and wherein the trays are elongated to allow a single row of pots to be placed in the tray along the length axis, and wherein the elongated horizontal track portion is arranged for arrangement of the trays on the elongated horizontal track portion with their length axes perpendicular to the beams of the elongated horizontal track portion.

15. The arrangement according to claim 12 or 13, wherein watering devices are arranged for intermittently providing water to the trays at the highest side, and wherein the elongated horizontal track portion is arranged inclined at an angle of about 0.5-2 degrees to the horizontal direction, which hinders water from remaining on the bottom of the trays, and wherein the remaining water flows out of the tray through an opening provided at the lower end of the tray.

16. The arrangement according to claim 13, wherein watering devices are arranged for intermittently providing water to the trays at the highest side, wherein elongated the horizontal track portion is arranged inclined at an angle of about 0.5-2 degrees to the horizontal direction, which hinders water from remaining on the bottom of the trays, wherein the remaining water flows out of the tray through an opening provided at the lower end of the tray, and wherein the watering devices comprise pipes situated at distances corresponding to the length of the steps of the stepwise movement of the trays.

17. The arrangement according to claim 15, comprising a mechanism for continuously purifying and recycling excess water that flows out from the openings in the trays, wherein the excess water passes through at least one of mechanical filters, biological filters and UV filters, and wherein the excess water which has passed through the filters is collected and thereafter mixed with nutrient, fertilizer and/or fresh water, and then pumped back to the arrangement for watering and providing plants with nutrient and fertilizer.

18. The arrangement according claim 12 or 13, wherein the inspection device includes an automated system utilizing a digital camera connected to a computer.

19. The arrangement according claim 12 or 13, wherein the harvester comprises a harvesting unit for harvesting the grown plants wherein three parallel first conveyor belts move trays with plants into harvesting unit, where the empty trays are moved out of the harvester on three parallel second conveyor belts, and the harvested plants are transported on three parallel third conveyor belts where a camera is provided to inspect the harvested plants to determine the size and colour of the plants of the harvested plants.

20. The arrangement according to claim 19, wherein organic wastes from the harvest inspection comprising plants that do not fulfil the predetermined requirements, are sent to a biogas production plant integrated or connected to arrangement, wherein bionutrients from the biogas production are transported to a sowing device for sowing seeds.

21. The arrangement according to claim 12 or 13, comprising a sterilisation device in which the trays and pots are subjected to steam, a cooling device in which the sterilized trays, pots and growing medium are allowed to cool off, a separation device by which the pots are removed from the trays and moved into the sowing device.

22. The arrangement according to claim 12 or 13, wherein the sterilisation device comprises a microwave radiation source in order to employ microwave radiation to heat residual water in the pots, to thereby heat the growing medium and the pots.

23. The arrangement according to claim 12 or 13, wherein said trays comprise unique identification tags such as Radio Frequency Identification (RFID) tags or barcodes, and wherein said arrangement further comprises scanning devices, such that movement of the trays can be monitored and controlled.

* * * * *